(12) United States Patent
Austrheim

(10) Patent No.: US 11,167,921 B2
(45) Date of Patent: Nov. 9, 2021

(54) AUTOMATED STORAGE AND RETRIEVAL SYSTEM

(71) Applicant: Autostore Technology AS, Nedre Vats (NO)

(72) Inventor: Trond Austrheim, Etne (NO)

(73) Assignee: Autostore Technology AS, Nedre Vats (NO)

( * ) Notice: Subject to any disclaimer, the term of this patent is extended or adjusted under 35 U.S.C. 154(b) by 50 days.

(21) Appl. No.: 16/492,807

(22) PCT Filed: Mar. 10, 2018

(86) PCT No.: PCT/EP2018/055989
§ 371 (c)(1),
(2) Date: Sep. 10, 2019

(87) PCT Pub. No.: WO2018/162757
PCT Pub. Date: Sep. 13, 2018

(65) Prior Publication Data
US 2020/0148470 A1    May 14, 2020

(30) Foreign Application Priority Data
Mar. 10, 2017    (NO) .................................... 20170360

(51) Int. Cl.
*B65G 1/04* (2006.01)
*B65G 1/137* (2006.01)
(52) U.S. Cl.
CPC ......... *B65G 1/0464* (2013.01); *B65G 1/0492* (2013.01); *B65G 1/0457* (2013.01);
(Continued)
(58) Field of Classification Search
CPC combination set(s) only.
See application file for complete search history.

(56) References Cited

U.S. PATENT DOCUMENTS

2001/0038784 A1  11/2001  Peltomaki
2015/0127143 A1   5/2015  Lindbo et al.
(Continued)

FOREIGN PATENT DOCUMENTS

CN      101407271 A     4/2009
CN      104781163 A     7/2015
(Continued)

OTHER PUBLICATIONS

International Search Report issued in International Application No. PCT/EP2018/055989, dated Mar. 10, 2018 (4 pages).
(Continued)

*Primary Examiner* — Kyle O Logan

(57) ABSTRACT

An automated storage and retrieval system comprising a three-dimensional grid (4) comprising a plurality of storage columns (5) in which storage containers are stored one on top of another in vertical stacks, and at least one port (28, 29) through which the storage containers can be transferred out of and/or into the grid; and a plurality of container handling vehicles (9) which are operated laterally on the grid for retrieving storage containers from and storing storage containers in the storage columns, and for transporting the storage containers laterally across the grid. The grid comprises a plurality of transfer columns (36, 37) for temporarily storing storage containers when in transit between the storage columns and the at least one port, wherein the container handling vehicles are arranged to transport the storage containers between the storage columns and the transfer columns, and wherein a port access vehicle is arranged to transport the storage containers between the transfer columns and the at least one port in a plane located above the container handling vehicles.

21 Claims, 9 Drawing Sheets

(52) U.S. Cl.
CPC .... *B65G 1/1378* (2013.01); *B65G 2201/0235* (2013.01); *G05D 2201/0216* (2013.01)

(56) References Cited

U.S. PATENT DOCUMENTS

| | | | |
|---|---|---|---|
| 2016/0145058 A1* | 5/2016 | Lindbo | B65G 1/0485 700/218 |
| 2018/0029798 A1* | 2/2018 | Lindbo | B65G 1/137 |

FOREIGN PATENT DOCUMENTS

| | | |
|---|---|---|
| CN | 106414278 A | 2/2017 |
| DE | 102009017241 A1 | 10/2010 |
| JP | 2015535517 A | 12/2015 |
| NO | 317366 B1 | 10/2004 |
| WO | 2013167907 A1 | 11/2013 |
| WO | 2014075937 A1 | 5/2014 |
| WO | 2014090684 A1 | 6/2014 |
| WO | 2014195901 A1 | 12/2014 |
| WO | 2014203126 A1 | 12/2014 |
| WO | 2015019055 A1 | 2/2015 |
| WO | 2015193278 A1 | 12/2015 |
| WO | 2016198467 A1 | 12/2016 |
| WO | 2016198565 A1 | 12/2016 |

OTHER PUBLICATIONS

Written Opinion issued in International Application No. PCT/EP2018/055989; dated Mar. 10, 2018 (9 pages).
Search Report Issued in Norwegian Patent No. 20170360, dated Oct. 10, 2017 (2 pages).
Office action issued in counterpart Chinese Appliction No. 2018800308292 dated Jun. 8, 2021 (7 pages).
Offie Action issued in counterpart Japanese Patent Application No. 2019548891 dated Aug. 13, 2021 (10 pages).

* cited by examiner

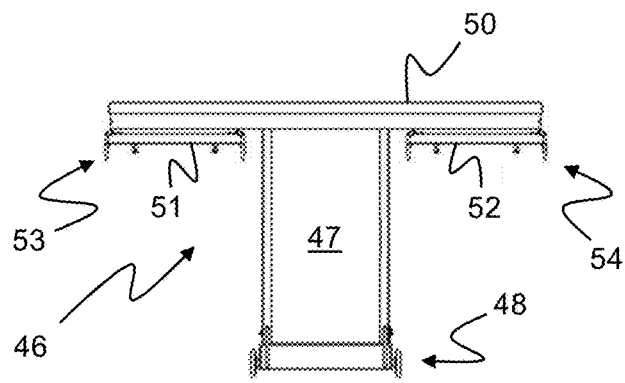
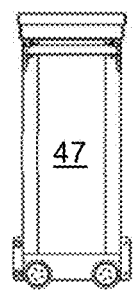
Fig. 7    Fig. 8
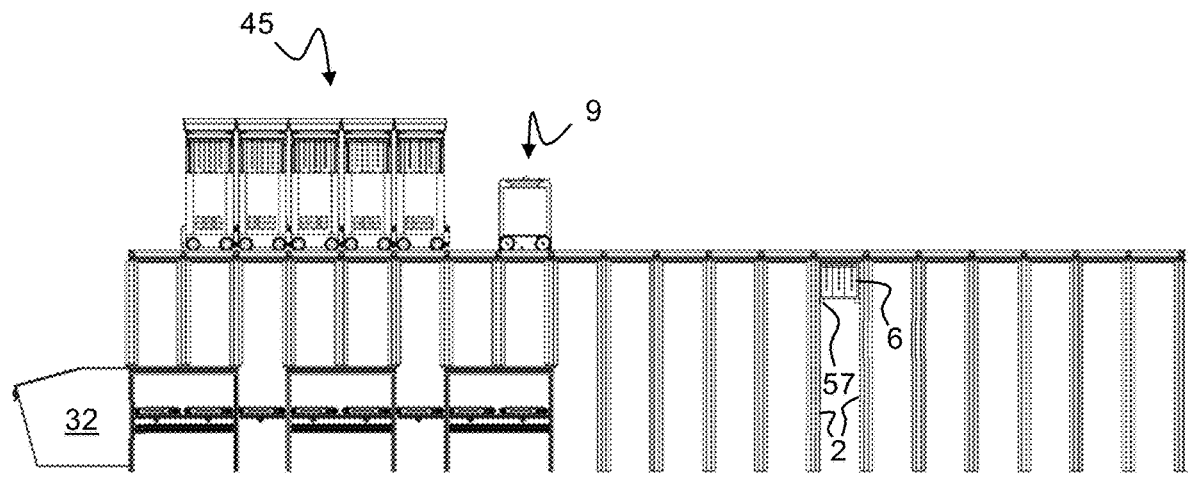
Fig. 9
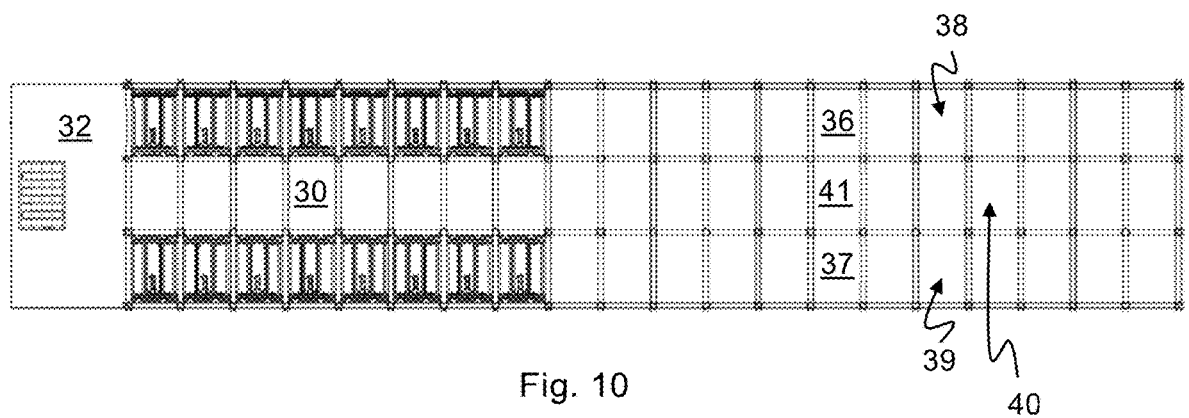
Fig. 10

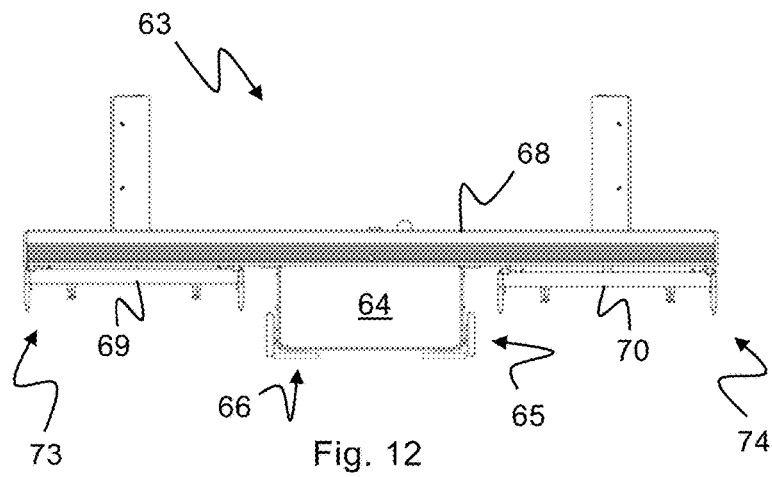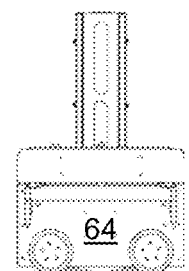
Fig. 12    Fig. 13
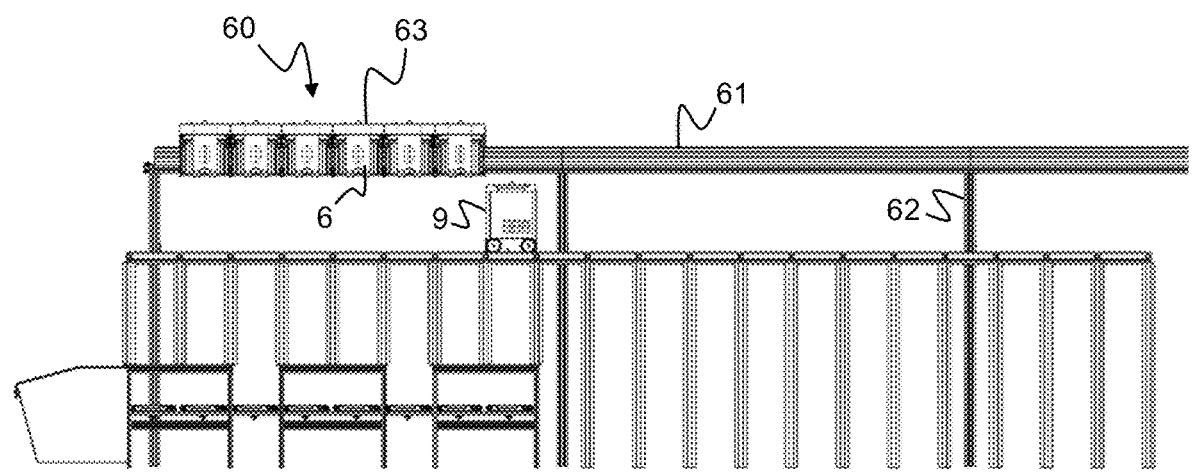
Fig. 14

AUTOMATED STORAGE AND RETRIEVAL SYSTEM

TECHNICAL FIELD

The present invention relates to an automated storage and retrieval system.

In particular, the present invention relates to an automated storage and retrieval system comprising:
- a three-dimensional grid comprising a plurality of storage columns in which storage containers are stored one on top of another in vertical stacks, and at least one port through which the storage containers can be transferred out of and/or into the grid; and
- a plurality of container handling vehicles which are operated on the grid for retrieving storage containers from and storing storage containers in the storage columns, and for transporting the storage containers horizontally across the grid.

The present invention also relates to a method of operating such an automated storage and retrieval system.

The present invention also relates to container handling system for transporting storage containers in an automated storage and retrieval system.

BACKGROUND AND PRIOR ART

FIG. 1 discloses a framework structure 1 of a typical prior art automated storage and retrieval system and FIG. 2 discloses a container handling vehicle of such a system.

The framework structure 1 comprises a plurality of upright members 2 and a plurality of horizontal members 3, which are supported by the upright members 2. The members 2, 3 may typically be made of metal, e.g. extruded aluminium profiles.

The framework structure 1 defines a storage grid 4 comprising storage columns 5 arranged in rows, in which storage columns 5 storage containers 6, also known as bins, are stacked one on top of another to form stacks 7. Each storage container 6 may typically hold a plurality of product items (not shown), and the product items within a storage container 6 may be identical, or may be of different product types depending on the application. The framework structure 1 guards against horizontal movement of the stacks 7 of storage containers 6, and guides vertical movement of the containers 6, but does normally not otherwise support the storage containers 6 when stacked.

The horizontal members 3 comprise a rail system 8 arranged in a grid pattern across the top of the storage columns 5, on which rail system 8 a plurality of container handling vehicles 9 are operated to raise storage containers 6 from and lower storage containers 6 into the storage columns 5, and also to transport the storage containers 6 above the storage columns 5. The rail system 8 comprises a first set of parallel rails 10 arranged to guide movement of the container handling vehicles 9 in a first direction X across the top of the frame structure 1, and a second set of parallel rails 11 arranged perpendicular to the first set of rails 10 to guide movement of the container handling vehicles 9 in a second direction Y, which is perpendicular to the first direction X. In this way, the rail system 8 defines grid columns 12 above which the container handling vehicles 9 can move laterally above the storage columns 5, i.e. in a plane which is parallel to the horizontal X-Y plane.

Each container handling vehicle 9 comprises a vehicle body 13 and first and second sets of wheels 14, 15 which enable the lateral movement of the container handling vehicle 9, i.e. the movement in the X and Y directions. In FIG. 2 two wheels in each set are visible. The first set of wheels 14 is arranged to engage with two adjacent rails of the first set 10 of rails, and the second set of wheels 15 arranged to engage with two adjacent rails of the second set 11 of rails. At least one of the set of wheels 14, 15 can be lifted and lowered, so that the first set of wheels 14 and/or the second set of wheels 15 can be engaged with the respective set of rails 10, 11 at any one time.

Each container handling vehicle 9 also comprises a lifting device (not shown in FIG. 1) for vertical transportation of storage containers 6, e.g. raising a storage container 6 from and lowering a storage container 6 into a storage column 5. The lifting device comprises a gripping device (not shown) which is adapted to engage a storage container 6, which gripping device can be lowered from the vehicle body 13 so that the position of the gripping device with respect to the vehicle body 13 can be adjusted in a third direction Z, which is orthogonal the first direction X and the second direction Y.

Conventionally, and also for the purpose of this application, Z=1 identifies the uppermost layer of the grid 4, i.e. the layer immediately below the rail system 8, Z=2 the second layer below the rail system 8, Z=3 the third layer etc. In the embodiment disclosed in FIG. 1, Z=8 identifies the lowermost, bottom layer of the grid 4. Consequently, as an example and using the Cartesian coordinate system X, Y, Z indicated in FIG. 1, the storage container identified as 7' in FIG. 1 can be said to occupy grid location or cell X=10, Y=2, Z=3. The container handling vehicles 9 can be said to travel in layer Z=0 and each grid column can be identified by its X and Y coordinates.

Each container handling vehicle 9 comprises a storage compartment or space for receiving and stowing a storage container 6 when transporting the storage container 6 across the grid 4. The storage space may comprise a cavity arranged centrally within the vehicle body 13, e.g. as is described in WO2014/090684A1, the contents of which are incorporated herein by reference.

Alternatively, the container handling vehicles may have a cantilever construction, as is described in NO317366, the contents of which are also incorporated herein by reference.

The container handling vehicles 9 may have a footprint and vertical projection, i.e. an extension in the X and Y directions, i.e. in a horizontal extension, which is generally equal to the lateral or horizontal extension of a grid column 12, i.e. the extension of a grid column 12 in the X and Y directions, e.g. as is described in WO2015/193278A1, the contents of which are incorporated herein by reference.

Alternatively, the container handling vehicles 9 may have a footprint and vertical projection which is larger than the lateral or horizontal extension of a grid column 12, e.g. as is disclosed in WO2014/090684A1.

The rail system 8 may be a single rail system, as is shown in FIG. 3. Alternatively, the rail system 8 may be a double rail system, as is shown in FIG. 4, thus allowing a container handling vehicle 9 having a vertical projection 22 generally corresponding to the lateral extension of a grid column 12 to travel along a row of grid columns even if another container handling vehicle 9 is positioned above a grid column neighbouring that row.

In a storage grid, a majority of the grid columns 12 are storage columns 5, i.e. grid columns where storage containers are stored in stacks. However, a grid normally has at least one grid column which is used not for storing storage containers, but which comprises a location where the container handling vehicles can drop off and/or pick up storage containers so that they can be transported to an access station where the storage containers can be access from outside of the grid or transferred out of or into the grid. Within the art, such a location is normally referred to as a "port" and the grid column in which the port is located may be referred to as a port column.

The grid 4 in FIG. 1 comprises two port columns 19 and 20. The first port column 19 may for example be a dedicated drop-off port column where the container handling vehicles 9 can drop off storage containers to be transported to an access or a transfer station (not shown), and the second port 20 column may be a dedicated pick-up port column where the container handling vehicles 9 can pick up storage containers that have been transported to the grid 4 from an access or a transfer station.

The access station may typically be a picking or a stocking station where product items are removed from or positioned into the storage containers. In a picking or a stocking station, the storage containers are normally never removed from the automated storage and retrieval system, but are returned back into the grid once accessed. A port can also be used for transferring storage containers out of or into the grid, e.g. for transferring storage containers to another storage facility (e.g. to another grid or to another automated storage and retrieval system), to a transport vehicle (e.g. a train or a lorry), or to a production facility.

A conveyor system comprising conveyors is normally employed to transport the storage containers between the ports and the access station.

If the port and the access station are located at different levels, the conveyor system may comprise a lift device for transporting the storage containers vertically between the port and the access station.

The conveyor system may be arranged to transfer storage containers between different grids, e.g. as is described in WO2014/075937A1, the contents of which are incorporated herein by reference.

WO2016/198467A1, the contents of which are incorporated herein by reference, disclose an example of a prior art access system having conveyor belts (FIGS. 5a and 5b) and a frame mounted track (FIGS. 6a and 6b) for transporting storage containers between ports and work stations where operators can access the storage containers.

When a storage container 6 stored in the grid 4 disclosed in FIG. 1 is to be accessed, one of the container handling vehicles 9 is instructed to retrieve the target storage container from its position in the grid 4 and transport it to the drop-off port 19. This operation involves moving the container handling vehicle to a grid location above the storage column in which the target storage container is positioned, retrieving the storage container from the storage column using the container handling vehicle's lifting device (not shown), and transporting the storage container to the drop-off port 19. If the target storage container is located deep within a stack 7, i.e. with one or a plurality of other storage containers positioned above the target storage container, the operation also involves temporarily moving the above-positioned storage containers prior to lifting the target storage container from the storage column. This step, which is sometimes referred to as "digging" within the art, may be performed with the same container handling vehicle that is subsequently used for transporting the target storage container to the drop-off port 19, or with one or a plurality of other cooperating container handling vehicles. Alternatively, or in addition, the automated storage and retrieval system may have container handling vehicles specifically dedicated to the task of temporarily removing storage containers from a storage column. Once the target storage container has been removed from the storage column, the temporarily removed storage containers can be repositioned into the original storage column. However, the removed storage containers may alternatively be relocated to other storage columns.

When a storage container 6 is to be stored in the grid 4, one of the container handling vehicles 9 is instructed to pick up the storage container from the pick-up port 20 and transport it to a grid location above the storage column where it is to be stored. After any storage containers positioned at or above the target position within the storage column stack have been removed, the container handling vehicle 9 positions the storage container at the desired position. The removed storage containers may then be lowered back into the storage column, or relocated to other storage columns.

For monitoring and controlling the automated storage and retrieval system, e.g. monitoring and controlling the location of respective storage containers within the grid 4; the content of each storage container 6; and the movement of the container handling vehicles 9 so that a desired storage container can be delivered to the desired location at the desired time without the container handling vehicles 9 colliding with each other, the automated storage and retrieval system comprises a control system (not shown in FIG. 1), which typically is computerised and comprises a database for keeping track of the storage containers.

A problem associated with known automated storage and retrieval systems is that the area surrounding the ports may become congested with container handling vehicles instructed to drop off or pick up storage containers. This may seriously impede the operation of the automated storage and retrieval system. In small systems this situation may possibly be alleviated by adding ports to the grid, as this will allow the container handling vehicles to be distributed among a larger number of ports in order to avoid congestion. However, if ports are added, the conveyor system infrastructure must normally be increased. This requires space, which may not necessarily be available. Also, adding conveyor system infrastructure is costly.

Furthermore, the current trend within the automated storage and retrieval system industry is that there is an increasing demand for larger storage grids. Since the number of storage containers stored in a grid generally scales as the volume of the grid, but the space available for ports generally scales as the surface of the grid, increasing the number of ports will not satisfactory solve the congestion problem when the grid size increases.

In view of the above, it is desirable to provide an automated storage and retrieval system, and a method for operating such a system, that solve or at least mitigate the aforementioned problem related to congestion of container handling vehicles at the ports.

SUMMARY OF THE INVENTION

According to one aspect of the invention, the grid comprises a plurality of transfer columns for temporarily storing storage containers when in transit between the storage columns and the at least one port, wherein the container handling vehicles are arranged to transport the storage containers between the storage columns and the transfer columns, and wherein a port access vehicle is arranged to transport the storage containers between the transfer columns and the at least one port in a plane located above the container handling vehicles.

According to another aspect of the invention, the method of operating the automated storage and retrieval system comprises the steps of:
- arranging, in the grid, a transfer zone comprising a plurality of transfer columns for temporarily storing storage containers when in transit between the storage columns and the at least one port;
- utilising the container handling vehicles, transporting the storage containers between the storage columns and the transfer columns; and
- utilising a port access vehicle which is operated on or above the grid, transporting the storage containers between the transfer columns and the at least one port in a plane which is located above the container handling vehicles.

Consequently, according to the invention the container handling vehicles are utilised to transport the storage containers between the storage columns and the transfer columns, and a dedicated port access vehicle, which is capable of transporting the storage containers above the container handling vehicles, is utilised to shuttle storage containers between the transfer columns and the port.

As compared to providing more ports to alleviate a congestion problem, it is easy to increase the number of transfer columns in the grid. Furthermore, transfer columns can be located inside the grid, e.g. at a distance from the circumference of the grid, thus allowing the container handling vehicles access to the transfer columns from the X and Y directions. A port, on the other hand, is normally located at the perimeter of the grid and, therefore, is normally only accessible from one direction.

By transporting the storage containers between the transfer columns and the port in a plane which is located above the container handling vehicles, i.e. above the plane where the container handling vehicles travel across the grid, any interference on the transfer of the storage containers between the transfer columns and the port may have on the movement of the container handling vehicles will be minimised.

In order to increase the capacity of the port access vehicle, it may be advantageous if the port access vehicle comprises a plurality of container lifting and holding devices enabling simultaneous transport of a plurality of storage containers between the transfer columns and the at least one port.

The number of transfer columns may be larger than the number of said at least one port.

It may be advantageous if the transfer columns form a transfer zone and the at least one port form a port zone, wherein the transfer zone is adjacent the port zone. Alternatively, the transfer zone may be arranged at a distance from the port zone.

The transfer zone may be arranged at a distance from the perimeter of the grid or, alternatively, the transfer zone may be arranged adjacent the perimeter of the grid.

It may be advantageous if the port access vehicle comprises a first lifting and transfer device arranged to carry a storage container from one of the transfer columns to the at least one port, and a second lifting and transfer device arranged to carry a storage container from the at least one port to one of the transfer columns. This may be particularly advantageous if the at least one port comprises at least one dedicated exit port, where storage containers are brought out of the grid to be accessed at an access station, and at least one dedicated entry port, where storage containers are brought back into the grid to be stored in the storage columns. In such a case, the first lifting and transfer device may cater for transportation of storage containers from the transfer columns to the exit port, and the second lifting and transfer device may cater for transportation of storage containers from the entry port to the transfer columns.

Also, it may be advantageous if the plurality of transfer columns comprises a first set of transfer columns for temporarily storing storage containers when in transit from the storage columns to the at least one port, and a second set of transfer columns for temporarily storing storage containers when in transit from the at least one port to the storage columns.

The port access vehicle may be operated on the grid, e.g. be arranged to travel along the rail system of the grid.

Alternatively, the port access vehicle may be operated above the rail, e.g. on a rail structure, e.g. a monorail, arranged above the grid.

The port access vehicle may comprise a plurality of vehicle sections which are connected one after the other in a train-like configuration, which vehicle sections each being configured to carry at least one storage container. This will allow the port access vehicle to easily be adopted to changing conditions in the grid.

The grid may comprise a framework structure comprising a plurality of upright members and a plurality of horizontal members which are supported by the upright members, which horizontal members comprise a rail system arranged in a grid pattern comprising grid columns, on which rail system the plurality of container handling vehicles are operated. In such a grid, it may be advantageous if the port access vehicle is arranged to travel linearly on or above the grid along a row of said grid columns, i.e. in the X direction or the Y direction. This will provide for an efficient transport of storage containers between the transfer columns and the at least one port.

In the following description, numerous specific details are introduced by way of example only to provide a thorough understanding of embodiments of the claimed system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

According to yet another aspect, the invention relates to a container handling system for transporting storage containers in an automated storage and retrieval system comprising:
- a three-dimensional grid comprising a plurality of storage columns in which storage containers are stored one on top of another in vertical stacks; and
- a plurality of first container handling vehicles which are operated on the grid for retrieving storage containers from and storing storage containers in the storage columns, and for transporting the storage containers horizontally across the grid;

wherein the container handling system comprises a second container handling vehicle being arranged for transporting the storage containers horizontally across the grid in a plane which is above the operating space of the first container handling vehicles.

The second container handling vehicle may comprise a vehicle section comprising a vehicle body and a horizontal bar mounted to the vehicle body comprising a container lifting and holding device arranged to hold a storage containers in a raised, holding position when the second container handling vehicle transports the storage container across the grid, which vehicle body has a vertical extension which is sufficient to allow the lifting and holding device to hold the storage container in a holding position which is above said operating space of the first container handling vehicles.

The container handling system may comprise an elevated rail structure supported by upright members, along which elevated rail structure the second container handling vehicle is arranged to travel, the second container handling vehicle comprising a vehicle section comprising a vehicle body and a horizontal bar mounted to the vehicle body comprising a container lifting and holding device arranged to hold a storage containers in a raised, holding position when the second container handling vehicle transports the storage container across the grid, which upright members have a vertical extension which is sufficient to allow the lifting and holding device to hold the storage container in a holding position which is above said operating space of the first container handling vehicles.

The container handling system may comprise a plurality of said elevated rail structures and a plurality of said second container handling vehicles independently operable along the elevated rail structures.

The second container handling vehicle may comprise a plurality of said vehicle sections connected in a train-like configuration.

The container handling system may form a port access system for transporting storage containers between a transfer zone and a port zone of a three-dimensional grid of an automated storage and retrieval system, and the second container handling vehicle may form a port access vehicle of such a system being arranged to transport the storage containers between the transfer zone and the port zone.

The container handling vehicles and the port access vehicle may be automated container handling vehicles, e.g. robots or robotic vehicles.

BRIEF DESCRIPTION OF THE DRAWINGS

Following drawings are appended to facilitate the understanding of the invention.

FIGS. 7 and 8 are orthogonal side views of a vehicle section of the port access vehicle according to FIG. 6.

FIG. 9 is a side view of the port access vehicle according to FIG. 6.

FIG. 10 is a top view of a port zone and part of a transfer zone of the grid according to FIG. 5.

FIGS. 12 and 13 are orthogonal side views of a vehicle section of the port access vehicle according to FIG. 11.

FIG. 14 is a side view of the port access vehicle according to FIG. 11.

In the drawings, like reference numerals have been used to indicate like parts, elements or features unless otherwise explicitly stated or implicitly understood from the context.

DETAILED DESCRIPTION OF THE INVENTION

Figure 1:
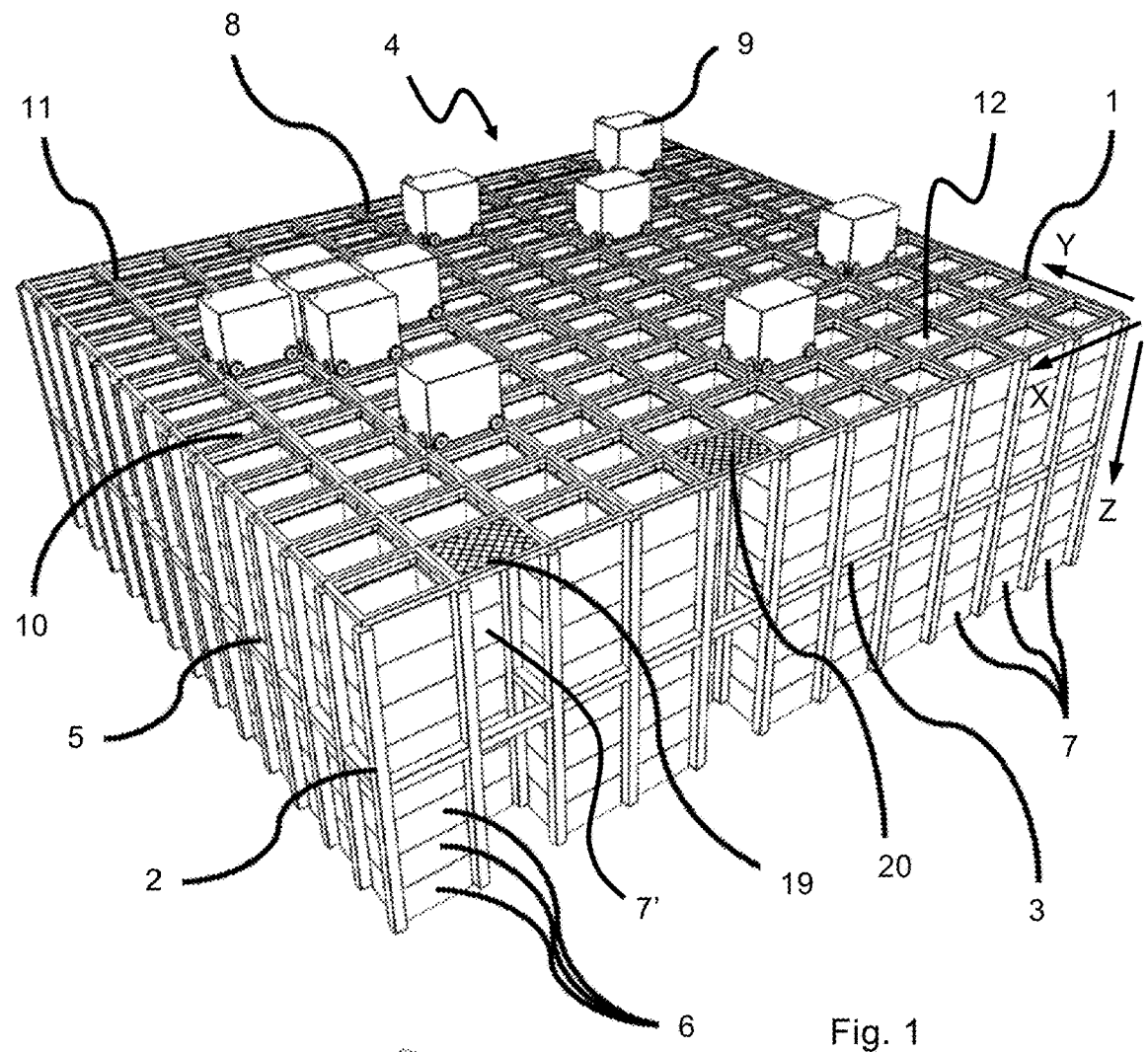
FIG. 1 is a perspective view of a grid of a prior art automated storage and retrieval system.

In the following, embodiments of the invention will be discussed in more detail with reference to the appended drawings. It should be understood, however, that the drawings are not intended to limit the invention to the subject-matter depicted in the drawings.

An embodiment of an automated storage and retrieval system according to the invention will now be discussed in more detail with reference to FIG. 5.

Figure 3:
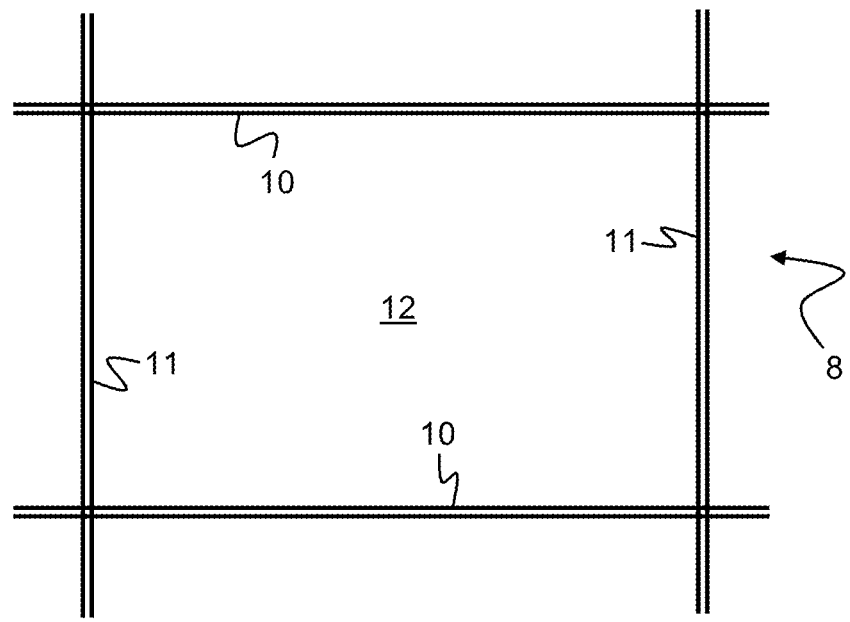
FIG. 3 is a top view of a prior art single rail grid.

FIG. 3 is a top view of a grid 4 of the automated storage and retrieval system. The grid 4 comprises a framework structure 1 comprising a plurality of upright members 2 (see FIG. 1) and a plurality of horizontal members 3 which are supported by the upright members. As is known in the art, the upright and horizontal members may typically be made of metal, e.g. extruded aluminium profiles.

The horizontal members 3 comprise a rail system 8 arranged in a grid pattern across the top of the storage columns, on which rail system 8 a plurality of container handling vehicles 9 are operated.

Figure 4:
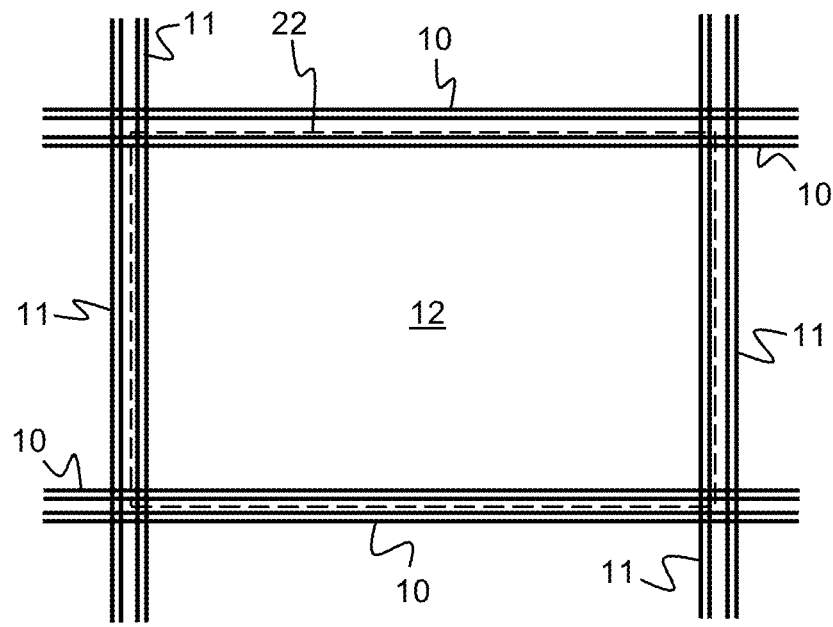
FIG. 4 is a top view of a prior art double rail grid.

The rail system 8 comprises a first set of parallel rails 10 arranged to guide movement of the container handling vehicles 9 in a first direction X across the top of the frame structure 1, and a second set of parallel rails 11 arranged perpendicular to the first set 10 to guide movement of the container handling vehicles 9 in a second direction Y that is perpendicular to the first direction X. In this way, the rail system 8 defines grid columns 12 in the horizontal X-Y plane, above which grid columns 12 the container handling vehicles 9 can move horizontally in the X and Y directions. Consequently, the horizontal area of a grid column 12, i.e. along the X and Y directions, may be defined by the distance between adjacent rails 10 and 11, respectively (also see FIG. 4).

Consequently, the rail system 8 allows the container handling vehicles 9 to move horizontally in the X-Y plane between different grid locations, where each grid location is associated with a grid column 12.

Figure 2:
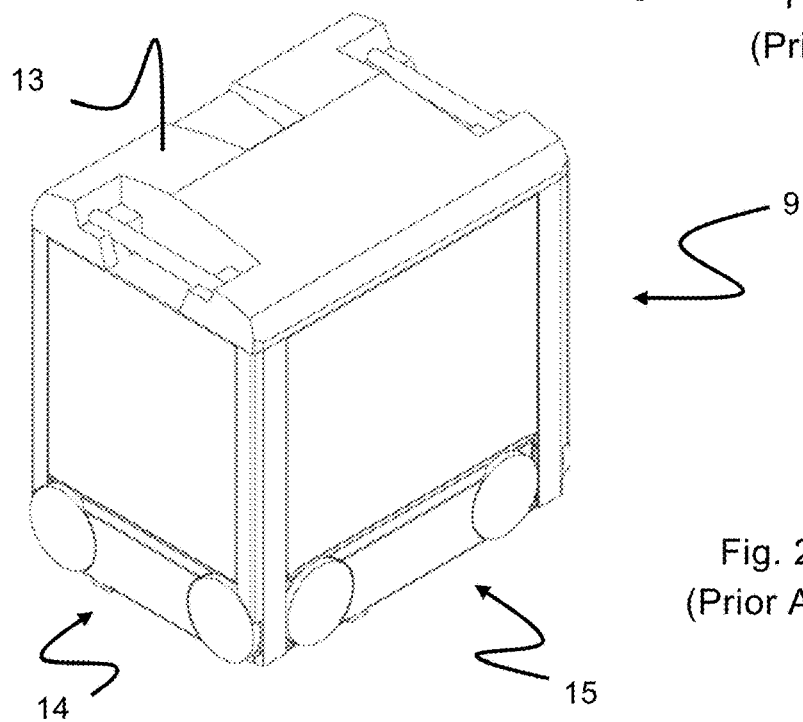
FIG. 2 is a perspective view of a prior art container handling vehicle.

The container handling vehicles 9 may be of any type of robot or automated container handling vehicle known in the art, e.g. any one of the automated container handling vehicles discussed in relation to FIGS. 1 and 2. It may be advantageous, however, if each container handling vehicle 9 comprises a centrally located storage space for receiving and stowing a storage container 6 when transporting the storage container horizontally across the grid 4, and a vertical projection, i.e. an extension in the X and Y directions, which is generally equal the horizontal extension of a grid column 12. This will allow a container handling vehicle 9 to transport a storage container above a row of grid columns even if another container handling vehicle 9 occupies a location above a grid column neighbouring the grid column row along which the first container handling vehicle is traveling.

In the disclosed embodiment, the grid 4 comprises a storage zone 25, two port zones 26 and two transfer or buffer zones 35. Each port zone 26, which is, for example, three grid cells wide in the X direction and seven grid cells long in the Y direction, comprises ports 28, 29 where storage containers can be transferred out of or into the grid 4. Each transfer zone 35, the function of which is discussed in more detail below, is three grid cells wide (in the X direction) and 43 grid cells long (in the Y direction) in the example shown. The storage zone 25, which makes up the rest of the grid 4, comprises storage columns 5 in which storage containers or bins 6 can be stacked one on top of another to form stacks 7.

Figure 5:
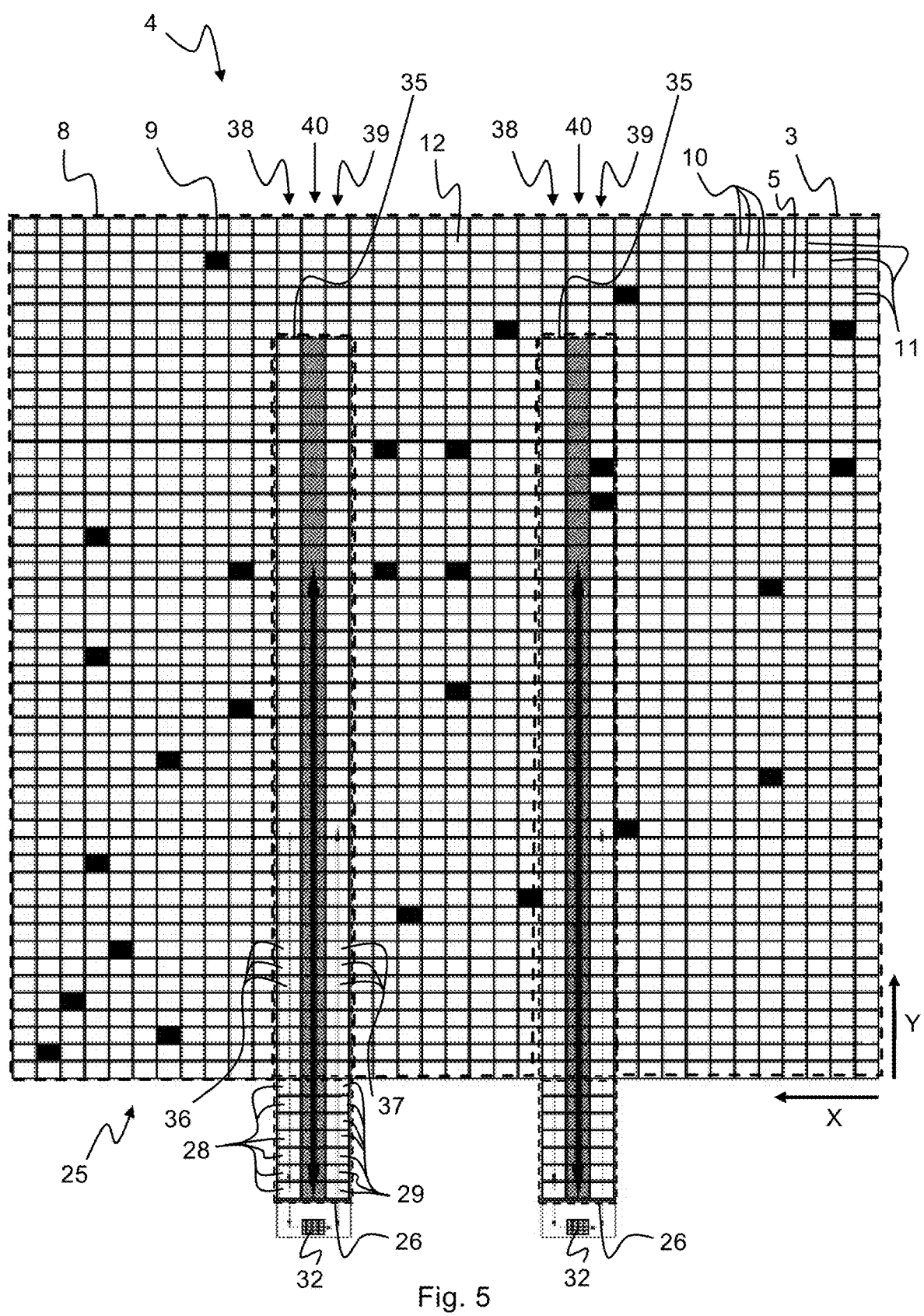
FIG. 5 is a top view of grid of an automated storage and retrieval system according to one embodiment of the invention.

Not including the port zones 26, the grid 4 in the example of FIG. 5 is 36 cells wide in the X direction and 50 cells long in the Y direction. In the Z direction (cf. FIG. 6), the grid 4 may have a height of five cells. It is understood, however, that the grid 4, in principle, can be of any size. In particular, it is understood that grid 4 can be considerably wider and/or longer than disclosed in FIGS. 5 and 6. For example, grid may have a horizontal extension of more than 600×600 grid cells. Also, the grid 4 can be considerably deeper than disclosed in FIG. 6. For example, a grid may be more than 10 grid cells deep.

Figure 6:
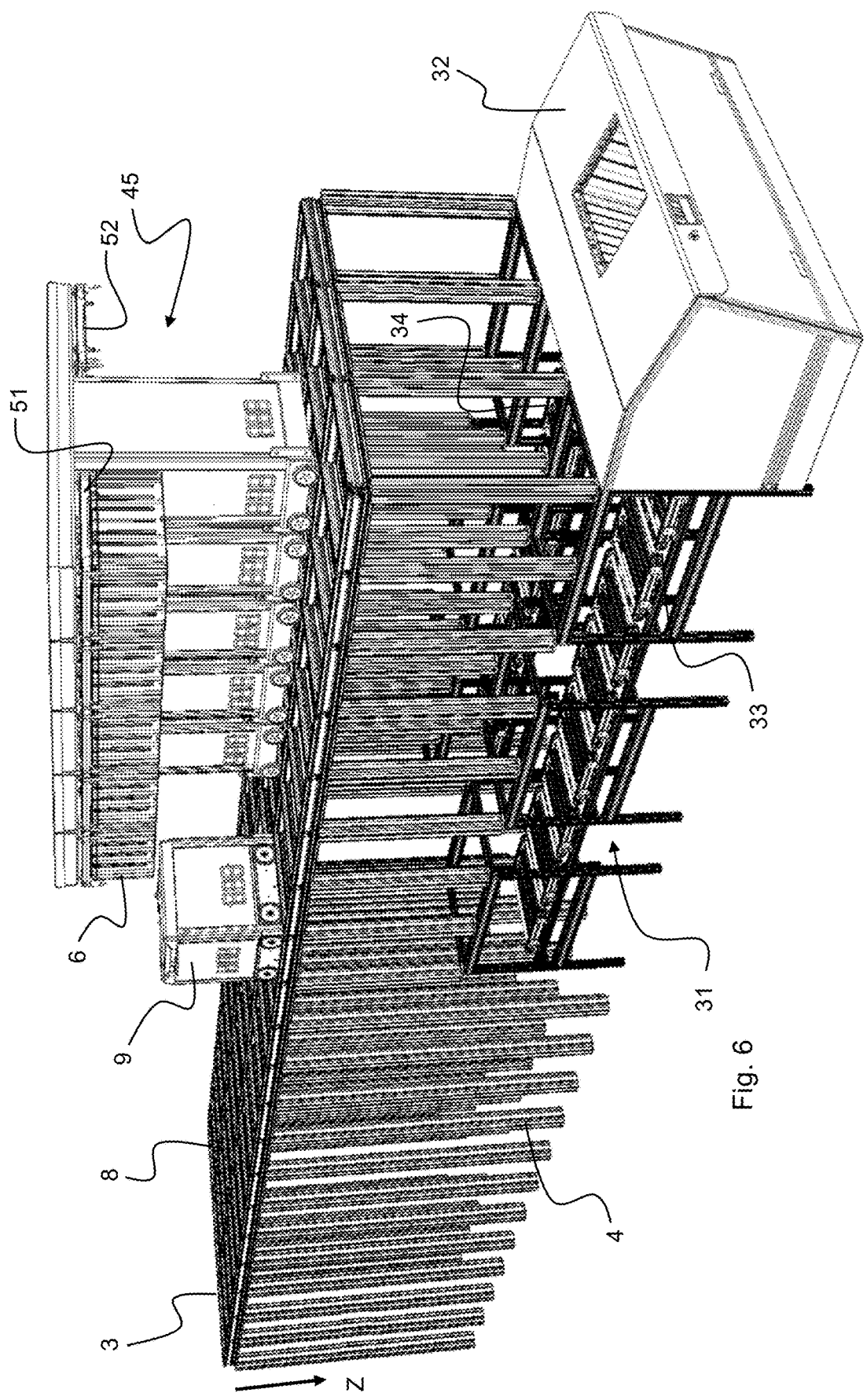
FIG. 6 is a perspective view of a first embodiment of a port access vehicle according to the invention.

FIG. 6 discloses a port zone 26 in more detail. Each port zone 26 comprises seven exit ports or exit port columns 28 through which the storage containers 6 can be brought out of the grid 4 to be accessed from outside of the grid 4. Each port zone 26 also comprises entry ports or entry port columns 29 through which storage containers 6 can be brought into the grid 4 to be stored in the storage columns 5. An access and transfer system 31 is arranged for transporting storage containers between the ports 28, 29 and an access station 32, which in the disclosed embodiment is a picking and stocking station. The access and transfer system 31 comprises a first conveyor 33 which is arranged underneath the exit ports 28 to transport storage containers from the exit ports 28 to the access station 32, and a second conveyor 34 which is arranged underneath the entry ports 29 to transport storage containers from the access station 32 to the entry ports 29.

The rail system 8 extends into the port zones 26 of the grid 4.

Each transfer zone 35 comprises transfer columns 36, 37 arranged to temporarily hold storage containers 6 when in transit between the storage zone 25 and the port zones 35. The transfer columns include drop-off columns 36 where the container handling vehicles 9 can drop off storage containers retrieved from the grid 4, and pick-up columns 37 where the container handling vehicles can pick up storage containers to be stored in the grid 4.

The drop-off columns 36 are arranged in a row 38 extending in the Y direction from the exit ports 28. The pick-up transfer columns 37 are arranged in a row 39 extending in the Y direction from the entry ports 29. An intermediate column row of grid columns 40 is positioned between rows 38 and 39. In other words, the drop-off columns 36 and the pick-up columns 37 are separated by the intermediate column row 40.

In the disclosed embodiment, the drop-off columns 36 and the pick-up columns 37 occupy positions Y=1 to Y=43 in each row 38 and 39. Consequently, the drop-off columns 36 and the pick-up columns 37 are 43 grid cells long, i.e. they extend 43 grid cells into the transfer zone 35. Since the number of drop-off and pick-up columns 36, 37 is larger than the number of ports 28, 29, the likelihood of a container handling vehicle 9 not finding a vacant drop-off column 36 where to deliver a storage container is low.

Port access vehicles are operated above the grid 4 for transferring storage containers 6 between the transfer zones 35 and the port zones 26. As will be discussed in more detail in the following, each port access vehicle is arranged to transfer storage containers above the operating plane of the container handling vehicles 9, i.e. in a plane above the operating space of the container handling vehicles 9, thus allowing the port access vehicle to transfer a storage container over a drop-off or pick-up transfer column 36, 37 even if a container handling vehicle 9 occupies the grid location above that drop-off or pick-up transfer column 36, 37. Consequently, container handling vehicles 9 can be dropping off or picking up storage containers from drop-off or pick-up transfer columns 36, 37 while the port access vehicle simultaneously transfers other storage containers between the transfer zone 36 and the port zone 26 above the container handling vehicles 9.

A first embodiment of a port access vehicle 45 will now be discussed in more detail with reference to FIGS. 6 to 10.

The port access vehicle 45 operates along the grid columns in row 40 (cf. FIG. 3), i.e. along a row of grid columns which extend into the grid from the port zone 26. The port access vehicle 45 may comprise a plurality of vehicle sections 46 which are connected in a train-like configuration, i.e. one after the other (e.g. cf. FIG. 7). Each vehicle section 46 comprises a vehicle body 47 which has a footprint which generally corresponds to the lateral or horizontal extension of a grid column 12, thus allowing the port access vehicle to pass between container handling vehicles which are dropping off or picking up storage containers in the transfer zone. At the lower end of the vehicle body 47, a set of wheels 48 is mounted and configured to allow the vehicle section 46 to travel on the rail system 8 in the Y direction along row 40.

In the train of vehicle sections 46 making up the port access vehicle 45, the set of wheels 48 of at least one the vehicle sections 46 is motorized in order to propel the port access vehicle 45.

The vehicle section 46 comprises a horizontal bar or frame 50 which is mounted to the top of the vehicle body 47 and extends horizontally from both sides of the vehicle body 47 orthogonal to the dedicated direction of travel of the vehicle section 46, which dedicated direction of travel is defined by the set of wheels 48. In other words, when in operation on the grid 4, the horizontal bar 50 extends in the X direction (e.g. cf. FIG. 4). On both sides of the vehicle body 47, the horizontal bar 50 supports a container lifting and holding device 53, 54. Each lifting and holding device 53, 54 comprises a container gripping device 51, 52, which can be lowered from the horizontal bar 50 to grip and hold a storage container. The gripping devices 51, 52 can be individually lowered in order to pick up and drop off storage containers independently of each other.

The lifting and holding devices 53, 54 are arranged to hold storage containers in a raised, holding position when the port access vehicle transports the storage containers 6 between the transfer zone 35 and the port zone 26. The vehicle body 47 of the vehicle sections 46 has a vertical extension which is sufficient to allow the lifting and holding devices 53, 54 to hold the storage containers 6 in a holding position which is above the operating space of the container handling vehicles (e.g. cf. FIG. 6).

When a storage container 6 stored in the grid 4 is to be accessed at the access station 32, one of the container handling vehicles 9 is instructed to retrieve the target storage container from its position in the grid 4 and transport it to one of the drop-off transfer columns 36, i.e. to one of the grid columns in row 38 in the transfer zone 35. This operation involves moving the container handling vehicle 9 to the grid location above the storage column in which the target storage container is positioned, retrieving the storage container from the storage column using the container handling vehicle's lifting device, and transporting the storage container to the intended drop-off transfer column 36. If the target storage container is located deep within a stack, i.e. with one or a plurality of other storage containers positioned above the target storage container, the operation also involves temporarily moving the above-positioned storage containers prior to lifting the target storage container from the storage column. This step may be performed with the same container handling vehicle that is subsequently used for transporting the target storage container to the drop-off transfer column 36 or, as is known in the art, with one or a plurality of other cooperating container handling vehicles. Alternatively, or in addition, as is also known in the art, the automated storage and retrieval system may have container handling vehicles specifically dedicated to the task of temporarily removing storage containers from a storage column. Once the target storage container has been removed from the storage column, the temporarily removed storage containers can be repositioned into the original storage column or, alternatively, relocated to other storage columns.

When the container handling vehicle 9 has positioned the target storage container in the drop-off transfer column 36 and left the transfer zone 35, e.g. to retrieve another storage container from the grid 4, the port access vehicle 45 is moved along row 40 and positioned with one of its vehicle sections 46 located above the grid column 41 in row 40 which is adjacent the drop-off transfer column 36 in which the container handling vehicle 9 has positioned the target storage container. The port access vehicle 45 then retrieves the target storage container from the drop-off transfer column 36 by lowering the gripping device 51, gripping the target storage container and raising it to the transfer position, i.e. a position above the operating plane of the container handling vehicles 9.

The port access vehicle 45 is then moved along row 40 from the transfer zone 35 to the port zone 26, where the port access vehicle 45 is positioned with the vehicle section 46 holding the target storage container located above a grid column 30 which is adjacent an exit port column 28. The target storage container is then lowered into exit port column 28 and positioned on conveyor 33, which transports the target storage container to the access station 32.

Once accessed at the access station 32, the target storage container is transferred back into the grid 4 to once again be stored in a storage column 5 in the storage zone 25. This operation is essentially the reversal of the above-discussed operation of fetching a storage container from the grid and involves:

transporting the target storage container from the access station 32 to one of the entry port columns 29 using conveyor 34;
positioning the port access vehicle 45 in the port zone 26 with the vehicle body 47 of one of the vehicle sections 46 located above a grid column adjacent entry port column 29,
lowering the gripping device 52 of the vehicle section 46 into the entry port column 29, engaging the target storage container and lifting it to the transfer position;
moving the port access vehicle 45 along row 40 from the port zone 26 to the transfer zone 35, where the port access vehicle 45 is positioned so that the vehicle body 47 of the vehicle section 46 holding the target storage container becomes located above a grid column 41 adjacent a pick-up transfer column 37;
lowering the target storage container into the pick-up transfer column 37;
instructing a container handling vehicle 9 to move to the pick-up column 37 and retrieve the target storage container; and
moving the container handling vehicle 9 to the storage column where the target storage container is to be stored and positioning the target storage container in its intended position in the stack.

In the drop-off and pick-up transfer columns 36, 37, the storage containers are advantageously stored in the uppermost layer of the grid, i.e. in the layer identified as Z=1. This will minimize the distance the gripping devices of the container handling vehicles and the port access vehicle needs travel when dropping off and picking up storage containers in the transfer zone 35, which will allow for rapid turnaround of the storage containers temporarily stored therein.

In order to allow the storage containers to be temporarily stored in the uppermost layer in the transfer zone, each transfer column 36, 37 may comprise stopping devices 57, e.g. clamps attached to the upright members 2 (see FIG. 6) surrounding each transfer column, which clamps prevent the storage container 6 from being lowered into the transfer column beyond level Z=1. Of course, the clamps can be attached to the upright members deeper down the transfer column, thus allowing the storage containers to be temporarily stored at deeper levels than Z=1.

The storage containers can be temporarily stored at different levels in different transfer columns. Also, in some applications it may be advantageous to simultaneously store more than one storage container in a transfer column. However, in such an application the port access vehicle needs to be configured to carry out a digging operation in order to retrieve a storage container temporarily stored below another temporarily stored storage container.

Due to the modular character of the port access vehicle 45, the vehicle 45 can easily be adapted to different transfer zone sizes and/or port configurations by adding or removing vehicle sections 46. Consequently, the port access vehicle 45 can be configured to simultaneously transfer a plurality of storage containers between the transfer zone 35 and the port zone 26. For example, when traveling from the transfer zone 35 to the port zone 26, gripping device 51 of all vehicle sections 46 can be employed to carry a storage container, e.g. as is shown in FIG. 6. Likewise, when traveling from the port zone 26 to the transfer zone 35, gripping device 52 of all vehicle sections 46 can be employed to carry a storage container.

FIGS. 11 to 16 show a further embodiment of a port access vehicle 60 where the vehicle 60 is arranged to travel along an elevated rail structure 61, e.g. a monorail, which is supported by upright members 62. In the disclosed example, the rail structure 61 is arranged vertically above grid column row 40 (see FIG. 10), i.e. it extends in the Y direction above the transfer zone 35.

Figure 11:
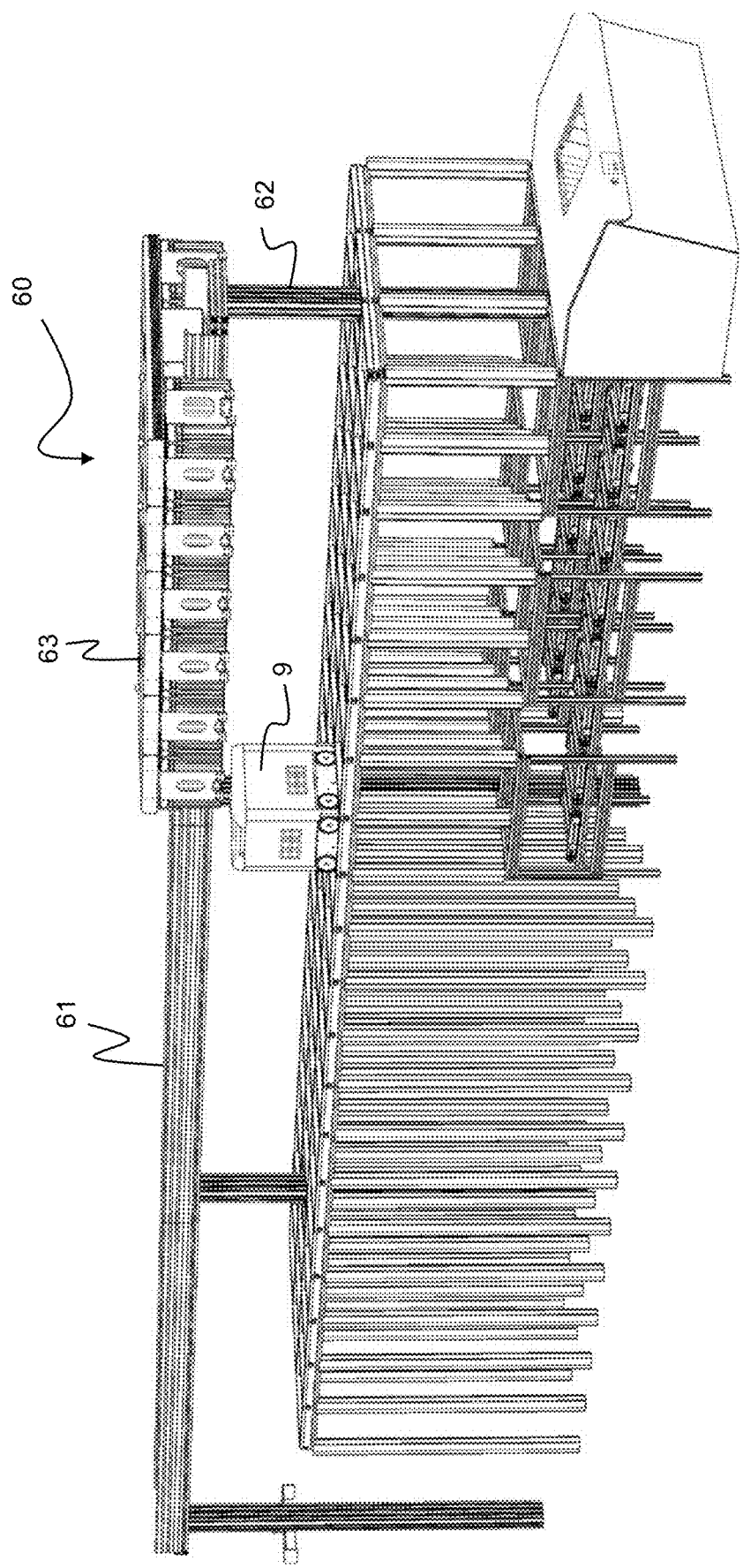
FIG. 11 is a perspective view of a second embodiment of a port access vehicle according to the invention.

The port access vehicle 60 comprises a plurality of vehicle sections 63 which are connected in a train-like configuration, i.e. one after the other (e.g. cf. FIG. 11). Each vehicle section 63 comprises a vehicle body 64. At the lower end of the vehicle body 64, a first set of wheels 65 is mounted and configured to allow the vehicle section 63 to travel along the rail structure 61. A second set of wheel 66 is configured to prevent the vehicle section 63 from derailing and falling down from the rail structure 61.

In the train of vehicle sections 63 making up the port access vehicle 60, the first set of wheels 65 and/or the second set of wheels 66 of at least one the vehicle sections 63 is motorized in order to propel the port access vehicle 60 along the monorail 61.

The vehicle section 63 further comprises a horizontal bar or frame 68 which is mounted to the top of the vehicle body 64 and extends horizontally from both sides of the vehicle body 64 orthogonally to the dedicated direction of travel of the vehicle section 63. In other words, when the port access vehicle 60 is in operation, the horizontal bar 68 will extend in the X direction (e.g. cf. FIG. 11). On both sides of the vehicle body 64, the horizontal bar 68 supports a storage container lifting and holding device 73, 74. Each lifting and holding device 73, 74 comprises a container gripping device 69, 70, which is arranged to be lowered from the horizontal bar 68 to grip and hold a storage container. The gripping devices 69, 70 can be individually lowered in order to pick up and drop off storage containers independently of each other.

Figure 15:
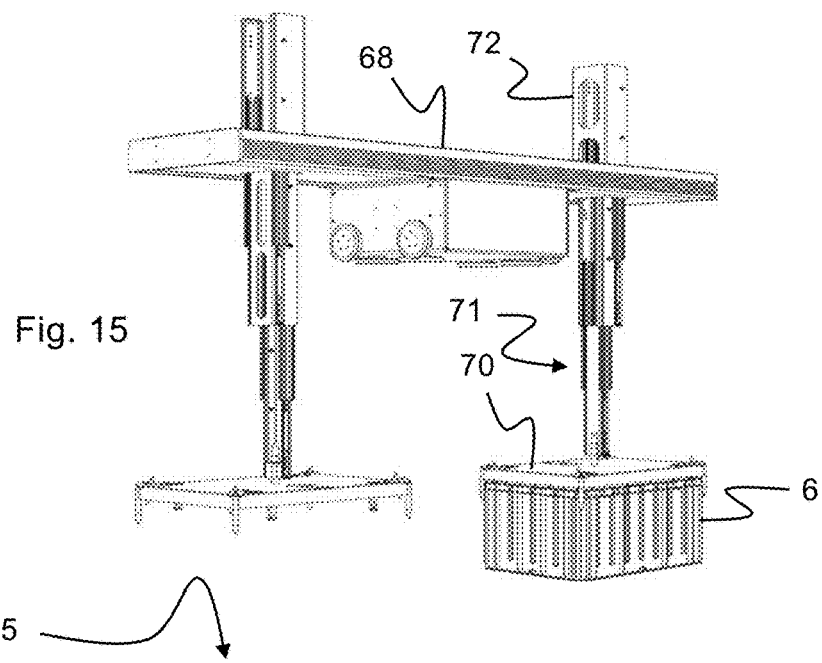
FIG. 15 is a perspective view of a vehicle section of the port access vehicle according to FIG. 11.

In the present embodiment, the lifting and holding devices 73, 74 each comprises a telescopic member 71 from which the gripping device 69, 70 is suspended (cf. FIG. 15). When retracted, the telescopic members 71 are protected by protective structures 72, which extend vertically from the horizontal bar 68.

The port access vehicle 60 generally operates in the same way as the previously described port access vehicle 45 with the difference that the port access vehicle 60 operates along an elevated rail structure 61 instead of on the grid rail system 8.

The rail structure 61 is mounted sufficiently high above the rail system 8 to allow storage containers 6 to be transferred between the transfer zone 35 and the port zone 26 in a plane located above the container handling vehicles 9.

Figure 16:
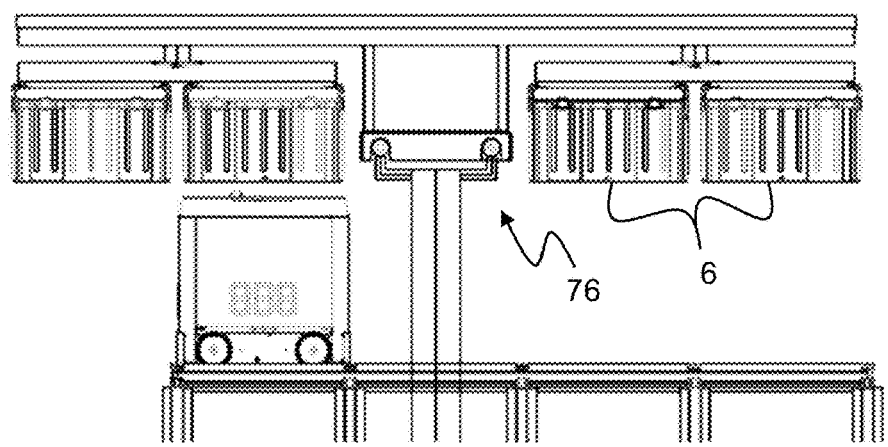
FIG. 16 is a side view of a third embodiment of a port access vehicle according to the invention.

FIG. 16 discloses a version of a port access vehicle 75 operated on an elevated rail structure where each gripping device of the port access vehicle 75 is capable of gripping and carrying two storage containers 6 simultaneously. This configuration requires that the transfer and port zones are (at least) five grid cells wide.

Figure 17:
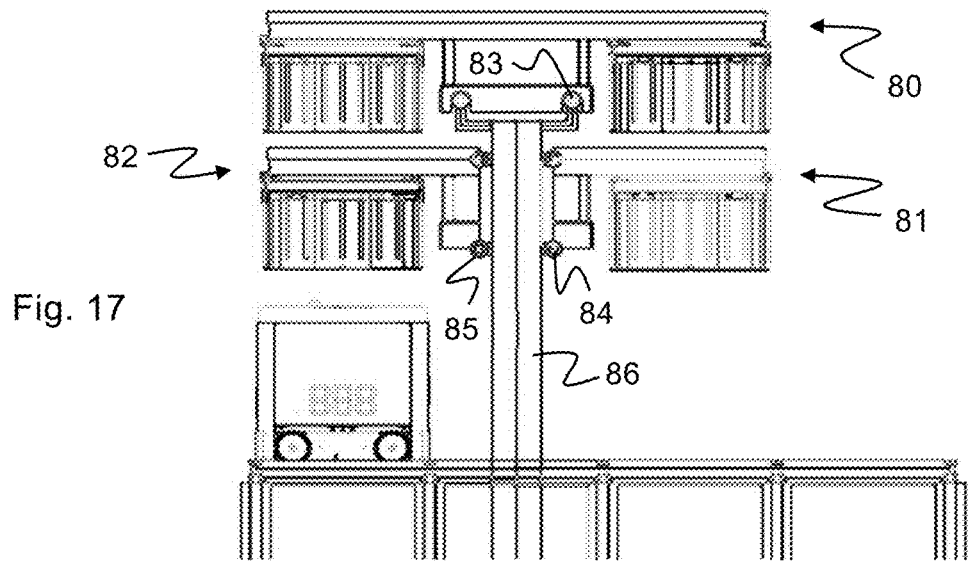
FIG. 17 is a side view of a fourth embodiment of a port access vehicle according to the invention.

FIG. 17 discloses yet another version of an elevated rail based system where three port access vehicle 80, 81, 82 are arranged for transferring storage containers between the a transfer zone and a port zone. The port access vehicles 80, 81, 82 are operating independently of one another above the container handling vehicles 9, each port access vehicle 80, 81, 82 having its own rail structure 83, 84, 85 along which it operates. Port access vehicle 80 is arranged to operate above port access vehicles 82 and 83, which operate at the same height but alongside each other. The rail structures 83, 84, 85 are supported by common upright members 86.

Figure 18:
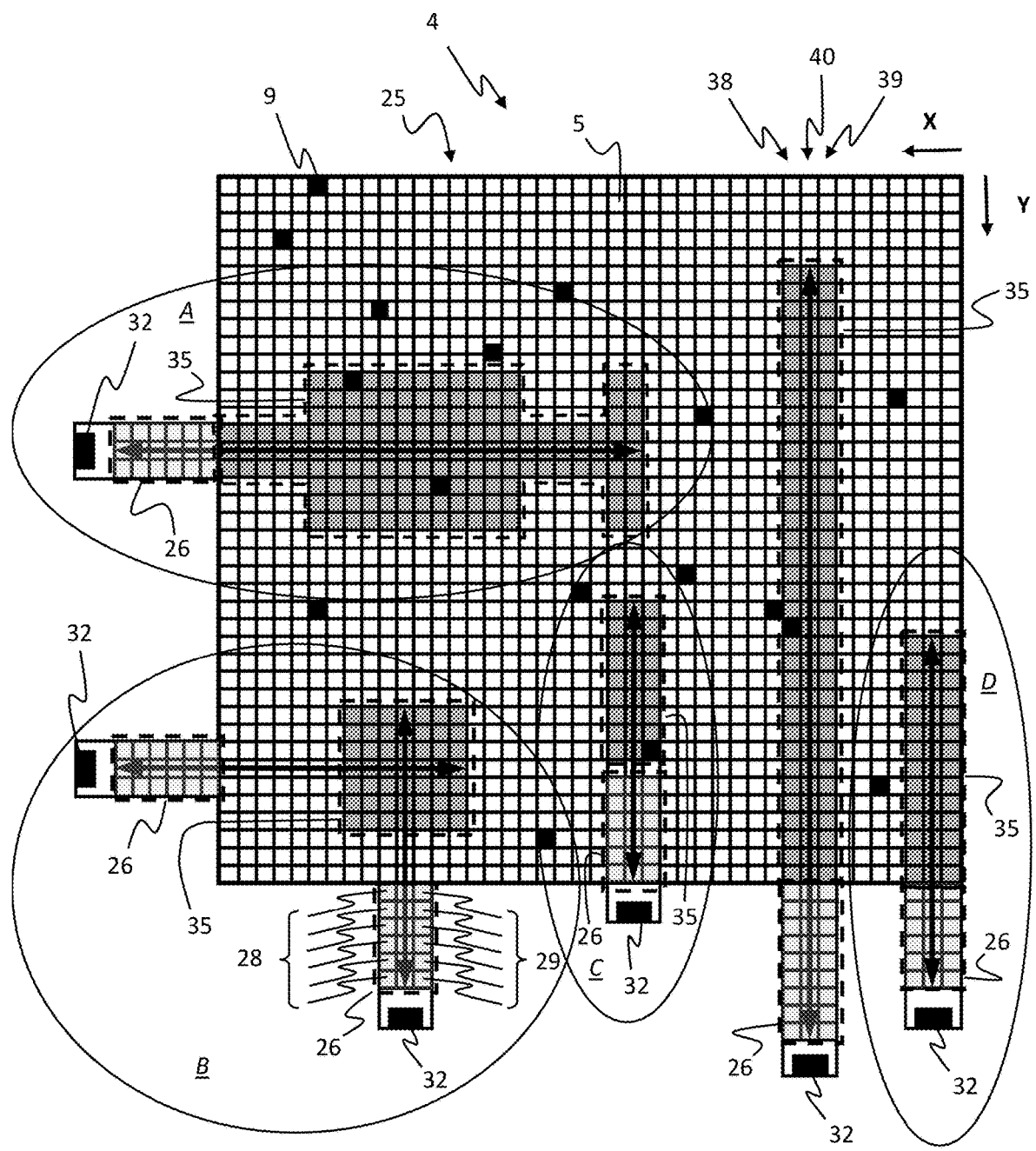
FIG. 18 is a top view of a grid showing different embodiments of transfer zone configurations.

FIG. 18 is a top view of a grid 4 of an automated storage and retrieval system according to the invention where possible positions and shapes of transfer zones 35 and port zones 26 are indicated. Areas shaded dark grey indicate transfer zones 35 and areas shaded light grey indicate port zones 26. Each port zone comprises ports 28, 29 and each transfer zone 35 comprises transfer columns. Each transfer zone 35 is associated with at least one port zone 26. White grid cells indicate storage columns 5 defining the grid's storage zone 25. Automated container handling vehicles 9 are operated on the grid 4 as previously disclosed, i.e. to transport storage containers between the storage columns 5 and the transfer zones 35, and double arrows extending along the port and transfer zones 26, 35 indicate the operation of port access vehicle operating as previously disclosed, i.e. to transport the storage containers between the transfer zones 35 and the port zones 26. The port access vehicles may for example be any one of the previously described port access vehicles 45,60,75,80, 81 or 82.

The region labelled A shows a transfer zone 35 with a non-rectangular shape. Since the length of the transfer zone 35 in the Y direction exceeds three rows, the port access vehicle serving the transfer zone 35 should be configured with bars or frames extending or being extendable in the Y direction in order to access the outermost drop-off and pick-up transfer columns. The bars may for example be telescopically extendible bars. The region labelled B shows a squared-shaped transfer zone 35 which may be accessed by two port access vehicles, one operating in the X direction and one in the Y direction. The region labelled C shows a configuration where the port zone 26 does not form an extending portion of the grid 4. The region labelled D shows a transfer zone 35 which is located adjacent the grid perimeter.

In the preceding description, various aspects of an automated storage and retrieval system according to the invention have been described with reference to the illustrative embodiment. However, this description is not intended to be construed in a limiting sense. Various modifications and variations of the illustrative embodiment, as well as other embodiments of the system, which are apparent to persons skilled in the art, are deemed to lie within the scope of the present invention as defined by the following claims.

| | Reference Numerals |
|---|---|
| 1 | framework structure |
| 2 | upright member |
| 3 | horizontal member |
| 4 | grid |
| 5 | storage column |
| 6 | storage container |
| 7 | stack |
| 8 | rail system |
| 9 | container handling vehicle |
| 10 | first set of parallel rails |
| 11 | second set of parallel rails |
| 12 | grid column |
| 13 | vehicle body |
| 14 | first set of wheels |
| 15 | second set of wheels |
| 16 | lifting device |
| 17 | gripping device |
| 18 | storage compartment, space |
| 19 | port column, drop-off port |
| 20 | port column, pick-up port |
| 22 | vertical projection |
| 25 | storage zone |
| 26 | port zone |
| 28 | exit port, port column |
| 29 | entry port, port column |
| 30 | grid column |
| 31 | access and transfer system |
| 32 | access station, picking and stocking station |
| 33 | first conveyor |
| 34 | second conveyor |
| 35 | transfer zone |
| 36 | drop-off column |
| 37 | pick-up column |
| 38 | row of columns |
| 39 | row of columns |
| 40 | intermediate column row |
| 45 | port access vehicle, second container handling vehicle |
| 46 | vehicle section |
| 47 | vehicle body |
| 48 | set of wheels |
| 50 | horizontal bar or frame |
| 51 | container gripping device |
| 52 | container gripping device |
| 53 | lifting and holding device |
| 54 | lifting and holding device |

-continued

| Reference Numerals | |
|---|---|
| 57 | stopping device, clamp |
| 60 | port access vehicle, second container handling vehicle |
| 61 | rail structure, monorail |
| 62 | upright member |
| 63 | vehicle section |
| 64 | vehicle body |
| 65 | set of wheels |
| 66 | set of wheels |
| 68 | horizontal bar or frame |
| 69 | container gripping device |
| 70 | container gripping device |
| 71 | telescopic member |
| 72 | protective structure |
| 73 | lifting and holding device |
| 74 | lifting and holding device |
| 75 | port access vehicle, second container handling vehicle |
| 76 | rail structure |
| 80 | port access vehicle, second container handling vehicle |
| 81 | port access vehicle, second container handling vehicle |
| 82 | port access vehicle, second container handling vehicle |
| 83 | rail structure, monorail |
| 84 | rail structure, monorail |
| 85 | rail structure, monorail |
| 86 | upright member |
| 90 | container handling system, port access system |

The invention claimed is:

1. An automated storage and retrieval system comprising:
   a three-dimensional grid comprising:
   a plurality of storage columns in which a plurality of storage containers are stored one on top of another in vertical stacks, and at least one port through which the storage containers can be transferred out of and/or into the grid; and
   a plurality of container handling vehicles which are operated on the grid for retrieving and storing the storage containers in the storage columns, and for transporting the storage containers horizontally across the grid;
   wherein the grid comprises a plurality of transfer columns for temporarily storing storage containers when in transit between the storage columns and the at least one port,
   wherein the container handling vehicles are arranged to transport the storage containers between the storage columns and the transfer columns, and
   wherein the automated storage and retrieval system comprises a port access vehicle arranged to transport the storage containers between the transfer columns and the at least one port in a plane located above the container handling vehicles.

2. The system according to claim 1, wherein the port access vehicle comprises a plurality of container lifting and holding devices that simultaneously transport the storage containers between the transfer columns and the at least one port.

3. The system according to claim 1, wherein the port access vehicle comprises a first lifting and holding device arranged to carry a storage container from one of the transfer columns to the at least one port, and a second lifting and transfer device arranged to carry the storage container from the at least one port to one of the transfer columns.

4. The system according to claim 1, wherein the plurality of transfer columns comprises a first set of transfer columns for temporarily storing the storage containers when in transit from the storage columns to the at least one port, and a second set of transfer columns for temporarily storing the storage containers when in transit from the at least one port to the storage columns.

5. The system according to claim 1, wherein the port access vehicle is operated on the grid.

6. The system according to claim 1, wherein the system comprises a rail structure arranged above the grid, and wherein the port access vehicle is configured to operate on said rail structure.

7. The system according to claim 1,
   wherein the port access vehicle comprises a plurality of vehicle sections which are connected one after the other in a train-like configuration, and
   wherein the plurality of vehicle sections are each configured to carry at least one storage container.

8. The system according to claim 1, wherein the number of the transfer columns is larger than the number of said at least one port.

9. The system according to claim 1, wherein the transfer columns form a transfer zone and the at least one port form a port zone, wherein the transfer zone is arranged at a distance from the port zone.

10. The system according to claim 1,
    wherein the grid comprises a framework structure comprising a plurality of upright members and a plurality of horizontal members which are supported by the upright members, and
    wherein the plurality of horizontal members comprises a rail system arranged in a grid pattern comprising grid columns, and
    wherein the plurality of container handling vehicles are operated on the rail system.

11. The system according to claim 10, wherein the port access vehicle is arranged to travel rectilinearly on or above the grid along a row of said grid columns.

12. The system according to claim 1, wherein the transfer columns form a transfer zone and the at least one port form a port zone, wherein the transfer zone is adjacent the port zone.

13. The system according to claim 12, wherein the transfer zone is arranged at a distance from the circumference of the grid.

14. The system according to claim 12, wherein the transfer zone is arranged adjacent to the circumference of the grid.

15. A method of operating an automated storage and retrieval system comprising:
    a three-dimensional grid comprising a plurality of storage columns in which storage containers are stacked one on top of another in vertical stacks, and a port zone which comprises at least one port allowing transfer of the storage containers out of and/or into the grid;
    a plurality of container handling vehicles which are operated laterally on the grid for retrieving and storing the storage containers in the storage columns, and for transporting the storage containers laterally across the grid;
    wherein the method comprises:
    arranging, in the grid, a transfer zone comprising a plurality of transfer columns for temporarily storing the storage containers when in transit between the storage columns and the at least one port;
    utilising the container handling vehicles, transporting the storage containers between the storage columns and the transfer columns; and
    utilising a port access vehicle which is operated on or above the grid, transporting the storage containers between the transfer columns and the at least one port in a plane which is located above the container handling vehicles.

16. The method according to claim 15, wherein the step of transporting the storage containers between the transfer columns and the at least one port comprises transferring the storage containers between the transfer columns and the at least one port simultaneously utilising the port access vehicle.

17. A container handling system for transporting storage containers in an automated storage and retrieval system comprising:
- a three-dimensional grid comprising:
  - a plurality of storage columns in which the storage containers are stored one on top of another in vertical stacks, and
  - a plurality of transfer columns for temporarily storing the storage containers when in transit between the storage columns and at least one port through which the storage containers can be transferred out of and/or into the grid; and
- a plurality of first container handling vehicles which are operated on the grid for retrieving and storing the storage containers in the storage columns, and for transporting the storage containers horizontally across the grid;
- wherein the container handling system comprises a second container handling vehicle being arranged for transporting the storage containers horizontally between the transfer columns and the at least one port across the grid in a plane which is above an operating space of the first container handling vehicles.

18. The container handling system according to claim 17, wherein the second container handling vehicle comprises a vehicle section comprising a vehicle body and a horizontal bar mounted to the vehicle body comprising a container lifting and holding device arranged to hold the storage containers in a raised, holding position when the second container handling vehicle transports the storage container across the grid, and
wherein the vehicle body has a vertical extension which allows the lifting and holding device to hold the storage container in a holding position which is above said operating space of the first container handling vehicles.

19. The container handling system according to claim 17, wherein the second container handling vehicle comprises a plurality of vehicle sections connected in a train-like configuration.

20. The container handling system according to claim 17, comprising an elevated rail structure supported by upright members,
wherein the second container handling vehicle is arranged to travel along the elevated rail structure, the second container handling vehicle comprising a vehicle section comprising a vehicle body and a horizontal bar mounted to the vehicle body comprising a container lifting and holding device arranged to hold the storage containers in a raised, holding position when the second container handling vehicle transports the storage container across the grid, and
wherein the upright members have a vertical extension which allows the lifting and holding device to hold the storage container in a holding position which is above said operating space of the first container handling vehicles.

21. The container handling system according to claim 20, comprising a plurality of said elevated rail structures and a plurality of said second container handling vehicles independently operated along the elevated rail structures.

* * * * *